United States Patent [19]

Salomonsson

[11] Patent Number: 4,466,323
[45] Date of Patent: Aug. 21, 1984

[54] BLADE GUIDE FOR SAW BLADES

[76] Inventor: Krister Salomonsson, Lästad Säteri, S-342 00 Alvesta, Sweden

[21] Appl. No.: 366,448

[22] Filed: Apr. 7, 1982

[30] Foreign Application Priority Data

Apr. 22, 1981 [SE] Sweden .................. 8102557

[51] Int. Cl.³ .................................. B27B 5/29
[52] U.S. Cl. ........................ 83/821; 83/171
[58] Field of Search ............... 83/821, 820, 822, 823, 83/824, 825, 826, 827, 828, 171, 835, 829; 308/36, DIG. 8

[56] References Cited

U.S. PATENT DOCUMENTS

| | | | |
|---|---|---|---|
| 434,756 | 8/1890 | Bill | 83/171 |
| 3,104,575 | 9/1963 | Robinson | 83/168 |
| 3,489,189 | 1/1970 | Thrasher | 83/821 |
| 3,534,647 | 10/1970 | Mills | 83/820 |
| 4,290,330 | 9/1981 | Washio et al. | 83/824 |
| 4,309,930 | 1/1982 | Wright | 83/820 |
| 4,324,163 | 4/1982 | Lavelle | 83/835 |

FOREIGN PATENT DOCUMENTS 79832 3/1952 Norway.

Primary Examiner—James M. Meister
Assistant Examiner—J. L. Knoble
Attorney, Agent, or Firm—Karl W. Flocks; Sheridan Neimark

[57] ABSTRACT

A blade guide for saw blades consists of a number of small cemented carbide plates which are moulded at intervals onto a base plate of steel or the like by means of a metal, such as brass or bronze, which is considerably softer than the carbide in the plates.

6 Claims, 3 Drawing Figures

BLADE GUIDE FOR SAW BLADES

The present invention relates to a blade guide for saw blades, which is characterized by comprising a number of small cemented carbide plates which are moulded at intervals onto a base plate of steel or the like by means of a metal, such as brass or bronze, which is considerably softer than the carbide in the plates. Carbide has proved to be an excellent material for blade guides since it causes even less friction than does fiber material. Up to now, however, it has not been possible to use carbide in blade guides because the large carbide plates in the guides have exploded due to the heat. This disadvantage has thus been overcome by the present invention.

The invention will be described more fully below with reference to the accompanying drawing which illustrates, by way of example, an embodiment of the blade guide and in which.

By 1 is designated a base plate of steel or the like on which a number of small cemented carbide plates 2 are mounted at intervals. More exactly, the carbide plates 2 are moulded onto the base plate 1 by means of a metal 3 which is considerably softer than the carbide in the plates 2, said metal 3 suitably consisting of brass or bronze. In order that the carbide plates 2 should be well fixed to the base plate 1 by means of the metal 3 the carbide plates are frustoconical in cross-section with the base of the cone facing and preferably adjacent the base plate 1.

Figure 1:
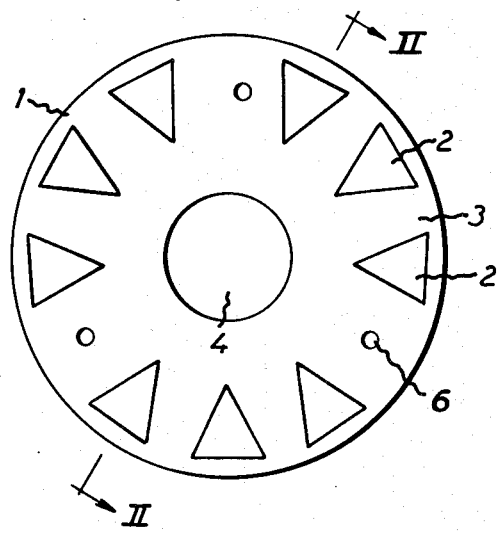
FIG. 1 is a side view of the blade guide.
Figure 2:
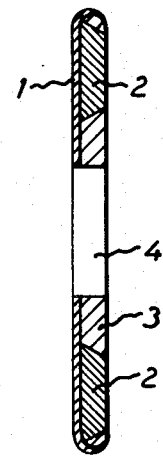
FIG. 2 is a cross-sectional view of the guide on line II—II in FIG. 1.
Figure 3:
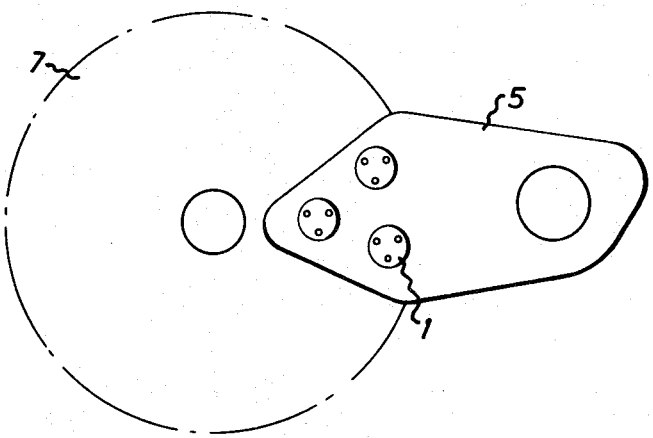
FIG. 3 shows three blade guides applied to a support which coacts with a saw blade.

The base plate 1 is preferably round and the carbide plates 2 are disposed along the periphery of the base plate 1. The base plate 1 is provided with a center hole 4 serving as water cooling channel. As seen in FIG. 1, the surface area of the soft metal 3 exceeds the surface area of the carbide plates 2.

The base plate 1 with its carbide plates 2 is intended to be mounted on a support 5. For this purpose the base plate 1 is provided, between groups of carbide plates 2, with holes 6 for screws or the like for attachment of the base plate 1 to the support 5. According to the drawing the support 5 is provided with three blade guides. One support 5 with blade guides is to be provided each on one side of the saw blade 7.

In a preferred embodiment of the blade guide the base plate 1 has a diameter of 70 mm and the center hole 4 has a diameter of 20 mm. The carbide plates 2 are in the form of equilateral triangles, each side being 15 mm and the thickness being 3 mm. The blade guide may of course be varied within relatively wide limits and the carbide plates 2 may be, for instance, rectangular, square or round.

The invention is not limited to that described above and shown in the drawing but can be varied within the scope of the appended claims.

What I claim and desire to secure by Letters Patent is:

1. A blade guide for saw blades, comprising a number of small cemented carbide plates (2) which are moulded at intervals onto a base plate (1) of steel or the like by means of a metal (3) which is considerably softer than the carbide in the plates (2), said base plate having an upturned peripheral edge extending for substantially the thickness of the carbide plate thereby forming a dish-like structure, and said small cemented carbide plates being adjacent said base plate on the interior of the dished configuration.

2. A blade guide for saw blades, comprising a number of small cemented carbide plates (2) which are moulded at intervals onto a base plate (1) of steel or the like by means of a metal (3) which is considerably softer than the carbide in the plates (2), the carbide plates 2 each comprising a frustoconical cross-section having a base thereof facing the base plate (1).

3. A blade guide as claimed in claim 1 or 2, wherein the base plate (1) is round, the carbide plates (2) being disposed along the periphery of the base plate (1).

4. A blade guide as claimed in claim 1 or 2, wherein said metal is selected from the group consisting of brass and bronze.

5. A blade guide as claimed in claim 3 having an annular configuration thereby defining a central hole (4) serving as a water-cooling channel.

6. A blade guide as claimed in claim 1 or 2, wherein the surface area of the soft metal exceeds the surface area of the cemented carbide plates.

* * * * *